US 7,063,273 B2

United States Patent
Hahn et al.

(10) Patent No.: US 7,063,273 B2
(45) Date of Patent: Jun. 20, 2006

(54) SPRAY DELIVERY SYSTEM

(76) Inventors: Kent S. Hahn, 1625 N. Garvin St., Evansville, Vanderburgh County, IN (US) 47711; Brannon W. Polk, 1625 N. Garvin St., Evansville, Vanderburgh County, IN (US) 47711

( * ) Notice: Subject to any disclaimer, the term of this patent is extended or adjusted under 35 U.S.C. 154(b) by 0 days.

(21) Appl. No.: 11/167,827

(22) Filed: Jun. 27, 2005

(65) Prior Publication Data

US 2006/0011741 A1   Jan. 19, 2006

Related U.S. Application Data

(60) Provisional application No. 60/588,137, filed on Jul. 15, 2004.

(51) Int. Cl.
*B05B 1/20* (2006.01)
*B05B 1/28* (2006.01)
*B05B 15/04* (2006.01)
*A01G 25/09* (2006.01)

(52) U.S. Cl. ...................... 239/159; 239/166; 239/167; 239/168; 239/172; 239/288; 239/288.3

(58) Field of Classification Search ................ 239/159, 239/166, 167, 168, 172, 288, 288.3, 161, 239/163, 164, 169, 175, 176, 288.5
See application file for complete search history.

(56) References Cited

U.S. PATENT DOCUMENTS

| | | | | |
|---|---|---|---|---|
| 3,512,714 A | * | 5/1970 | Phelps et al. | 239/168 |
| 3,565,340 A | * | 2/1971 | Meinert et al. | 239/168 |
| 3,666,178 A | * | 5/1972 | Crimmins et al. | 239/77 |
| 3,887,132 A | * | 6/1975 | Widmer | 239/166 |
| 4,353,505 A | * | 10/1982 | Kinder | 239/167 |
| 4,372,492 A | * | 2/1983 | Blumenshine | 239/168 |
| 4,641,781 A | * | 2/1987 | McCrea et al. | 239/159 |
| 4,646,971 A | * | 3/1987 | Rogers | 239/166 |
| 5,156,338 A | * | 10/1992 | Borland et al. | 239/288 |
| 5,310,116 A | * | 5/1994 | Broyhill | 239/172 |
| 5,520,335 A | * | 5/1996 | Claussen et al. | 239/104 |
| 6,293,475 B1 | * | 9/2001 | Sobolik | 239/168 |
| 6,367,712 B1 | * | 4/2002 | Larsen | 239/159 |
| 6,422,483 B1 | * | 7/2002 | Yocom et al. | 239/159 |
| 6,837,446 B1 | * | 1/2005 | Jesse | 239/161 |

* cited by examiner

*Primary Examiner*—David A. Scherbel
*Assistant Examiner*—Darren Gorman
(74) *Attorney, Agent, or Firm*—Gary K. Price, Esq.

(57) ABSTRACT

A spray delivery system including a sectional boom attachable to a vehicle. The boom includes first and second movable arms and a fixed arm, each arm housing a plurality of spray nozzles. Each arm can include a frame having openings so that the arms are light-weight and so that the nozzles housed in the frames for protection can spray through the openings in the bottom surface of the frame. The movable arms include an operation position and a retracted position and the arms each include a drift shroud covering to prevent wind from interfering with the application of spray from nozzles. The drift shrouds can include windows that align with the openings in the frame such that an operator can see the spray from the nozzle from the operator's seat in the vehicle.

25 Claims, 13 Drawing Sheets

Figure 1
Typical Turf Sprayer

Figure 6 – Convertability

Figure 7 – Converted with Drift Shroud

Figure 7A
Drift Shrouded Boom Retracted

Figure 8 – Pivot Bracket

SPRAY DELIVERY SYSTEM

CROSS REFERENCES TO RELATED APPLICATIONS

U.S. Provisional Application for Patent No. 60/588,137, filed Jul. 15, 2004, with title "Spray Delivery System" which is hereby incorporated by reference. Applicant claims priority pursuant to 35 U.S.C. Par. 119(e)(i).

Statement as to rights to inventions made under Federally sponsored research and development: Not Applicable

BACKGROUND OF THE INVENTION

1. Field of the Invention

The present invention relates generally to spray boom systems for the purpose of applying fertilizers and pesticides on turf, golf courses and sports fields. Spray booms are typically mounted on the rear of a dedicated vehicle sprayer or tractor mounted sprayer. Spray boom systems are typically mounted less than 24 inches from the ground and can be 20 foot wide for turf spray applications.

2. Brief Description of Prior Art

One important consideration in the spray application of chemicals such as fertilizers and pesticides can be disturbance of the spray by factors such as wind. Gusts of wind can blow agricultural spray chemicals causing a variety of problems including the loss of expensive chemicals, misapplication of chemicals where they do not belong and health problems to the person applying the chemicals and even to people neighboring the application. For example, most spray applicator vehicles do not have a cab, so if the wind can carry the spray the operator is bound to be exposed to the wind borne spray during the application process. Also, golf courses which are a big user of ag chemicals are typically surrounded by expensive homes. To further the problem, many golf courses are built in areas such as coastal areas and islands that are prone to having high winds.

U.S. Pat. No. 5,431,341 shows a typical agricultural sprayer such as might be used on golf courses. The device exhibits a number of the problems with the prior art. For example, the device has brush shields 10 to limit wind blown spray however, the shields 10 blind the operator from being able to see the chemicals as applied. It is desirable for the operator to be able to see that the chemicals are actually being applied and how much, otherwise an operator can drive around with an empty tank believing they are spraying. The shields 10 are also applied with bolts. In this case, wing nuts allow for a somewhat quick mounting and release but wing nuts are prone to get lost. Bolts and wing nuts also corrode, making it a chore to install and remove the shields. This patent '341 uses castors to support the ends of the device. Castors cause further problems. Castors can jar the equipment when they hit a bump and on a golf course they can fall into the sand traps and cause ruts in soft ground. Because the operator cannot see the castors they have a tendency to run over things. Castors also track through the applied chemical and can transfer the chemicals to areas where they are not wanted. Castors further transmit vibration to spray booms causing premature failure. Another problem with the prior art and patent '341 is that the nozzles are unprotected and yet run close to the ground. It is common for nozzles and related plumbing that are unprotected like nozzle 20 to get bent or broken or fouled when the operator accidentally hits an obstacle or even when an operator purposely drives over something believing there is sufficient clearance. Another problem is the tendency to hit obstacles because the spray boom is so wide. Hitting an obstacle with the boom of patent '341 will most likely damage the boom and possibly cause a number of leaks. Because of the reliability problems and weight of the shields 10 they are sometimes removed from the equipment again, allowing wind to carry the chemical spray.

U.S. Pat. No. 6,491,234 addresses another problem with long sprayer booms which is the shock caused when the vehicle hits a bump. The long sprayer arms, if unsupported, tend to amplify each movement with a pendulum effect. Patent '234 uses conventional shock absorbers to absorb some of this movement and to dampen the pendulum effect. Patent '234 is limited to a telescoping boom without shields.

As will be seen from the subsequent description, the preferred embodiments of the present invention overcome the above problems and difficulties of the prior art.

SUMMARY OF THE INVENTION

The present invention is directed to a spray delivery system including folding spray booms. The spray delivery system includes a sectional boom attachable to a vehicle. The boom can include first and second movable arms and a fixed arm, each arm housing a plurality of spray nozzles. Each arm can include a frame having openings so that the arms are light-weight and so that the nozzles housed in the frames for protection can still spray through the openings in the bottom surface of the frame. The movable arms include an operation position and a retracted position and the arms can each include a drift shroud covering to prevent wind from interfering with the application of spray from nozzles. The drift shrouds can include windows that align with the openings in the frame such that an operator can see the spray from the nozzle from the operator's seat in the vehicle and can service the nozzles without removing the drift shrouds.

DESCRIPTION OF THE PREFERRED EMBODIMENT

Figure 1:
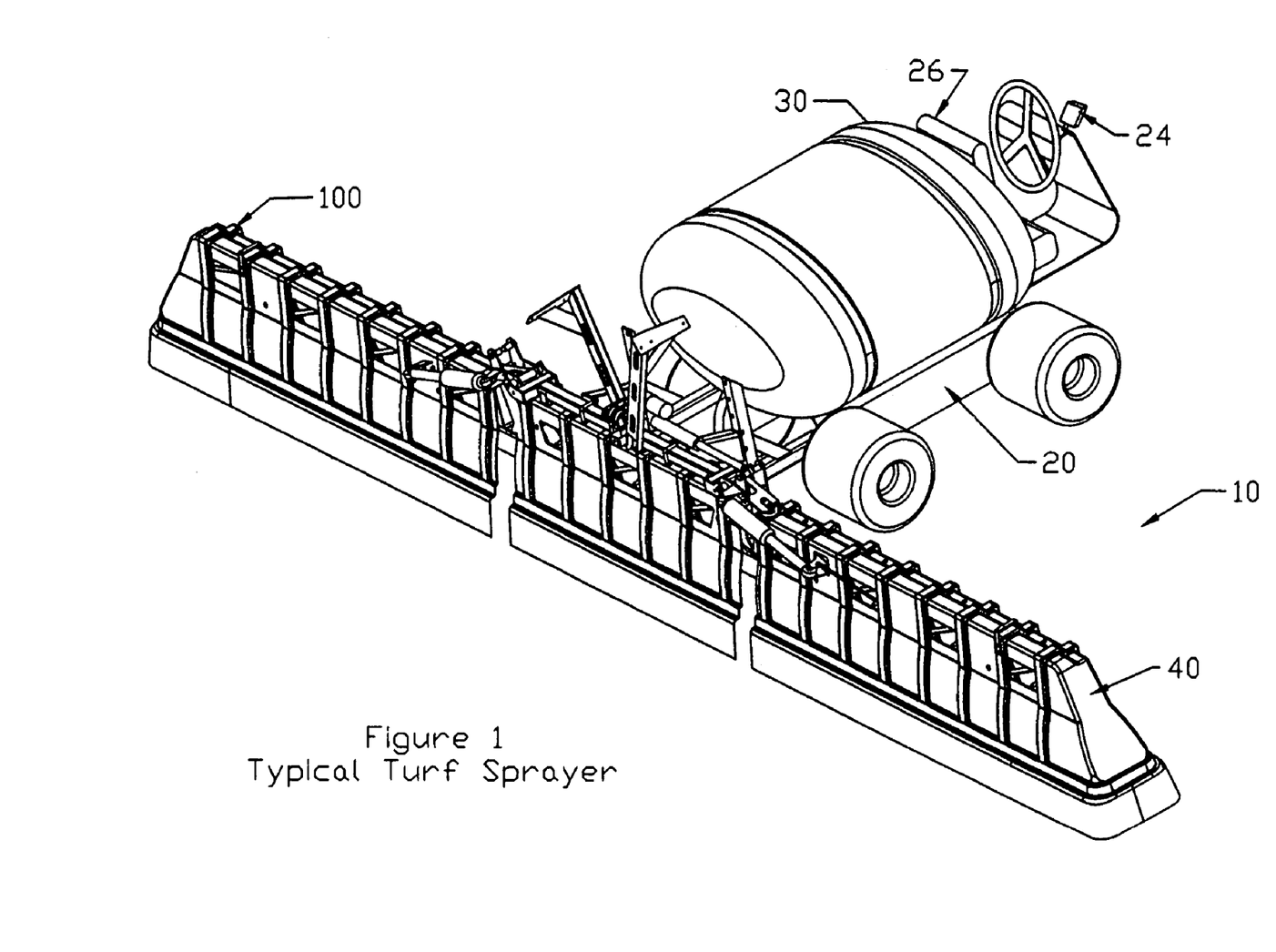
FIG. 1 is a view of the spray boom system.

In accordance with the present invention, FIGS. 1–11 show a spray boom system 10. The spray boom system 10 includes a vehicle 20 that can carry a tank 30 of liquid material such as herbicide or pesticide for example. A drift shroud 40 covered boom 100 can include a fixed arm section 102 and two movable arm sections 106 and 108 that can pivot upward, forward or backwards under certain conditions. The vehicle 20 can include a control box 24 that can allow an operator to control operation of the spray boom system 10. The boom arms 106, 108 have a normal spray position as shown in FIG. 1 wherein the arms 106, 108 lie generally horizontal and parallel to the ground.

Figure 2:
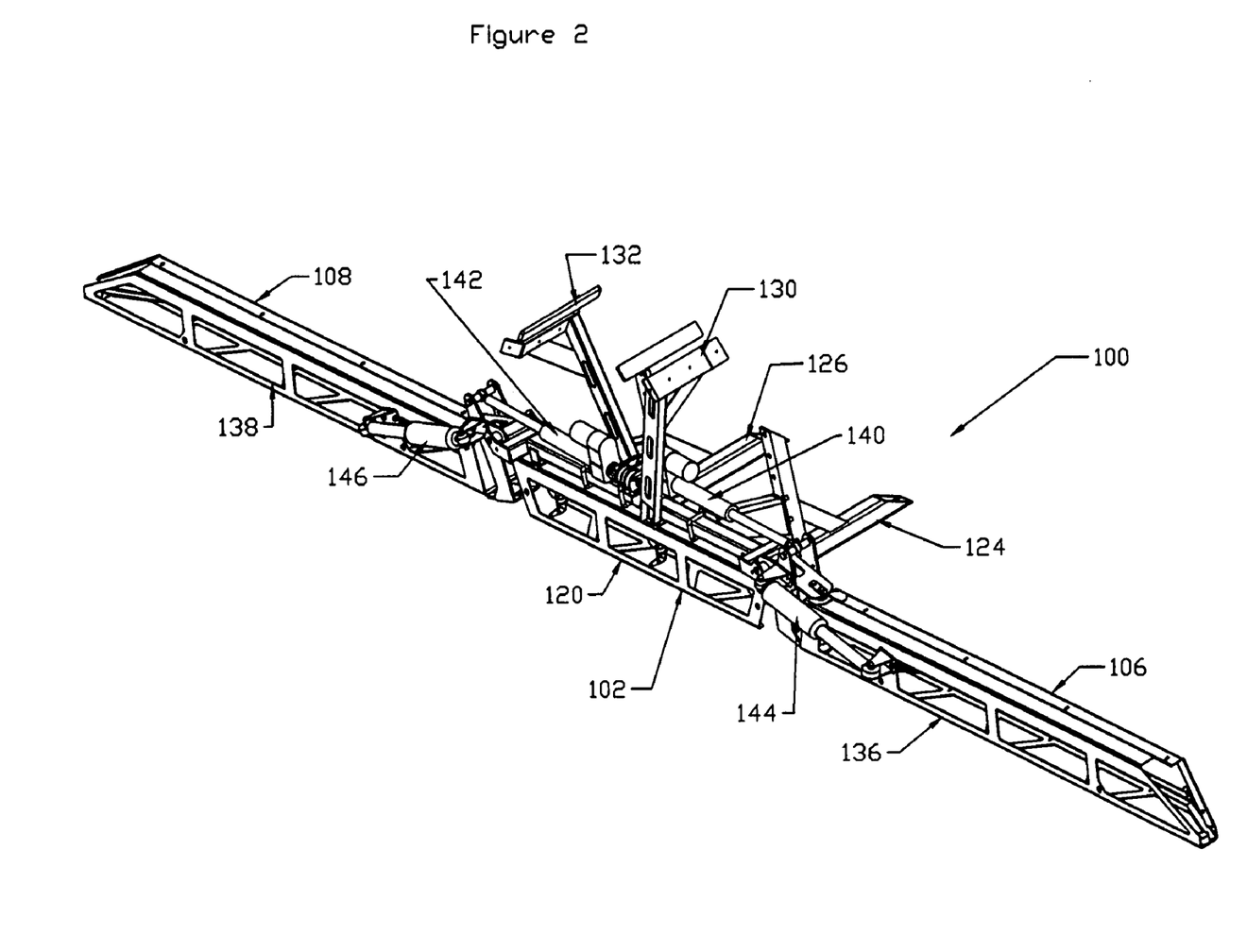
FIG. 2 is a view of details of the boom.

FIG. 2 shows the boom 100 with the drift shroud 40 removed for clarity. The fixed arm section 102 includes an open frame 120 that can be formed of sheet metal. A vehicle attachment such as attachment bars 124, 126 allow the boom 100 to be mounted to the vehicle 20. The fixed arm section 102 can include stops 130, 132 that can provide a positive stop for the movable arms 106, 108 when they are pivoted to a storage position.

The movable arm 106 can include an open sheet metal frame 136. An actuator 140, which can be hydraulic, pneumatic or electric, controls the position of the movable arm 106 and shock absorber 144 allows the movable arm 106 to pivot relative to the vehicle 20 if it strikes an object.

The movable arm 108 can include an open sheet metal frame 138. An actuator 142 controls the position of the movable arm 108 and shock absorber 146 allows the movable arm 108 to pivot relative to the vehicle 20 if it strikes an object.

Figures 3, 3A:
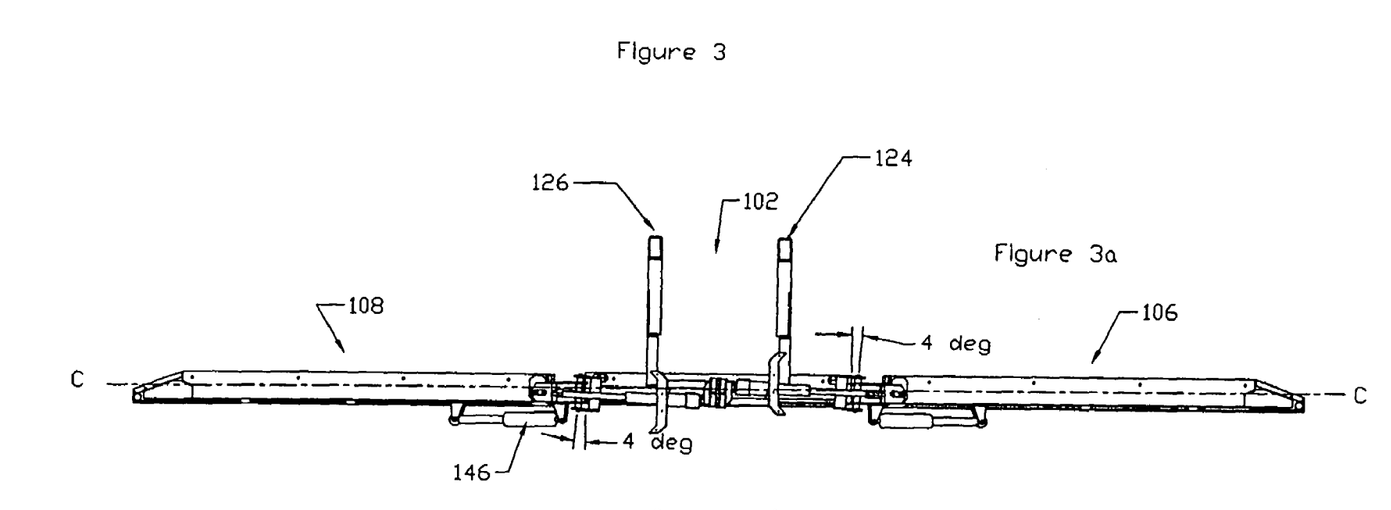
FIGS. 3A and 3B show further boom details.
Figure 3B:
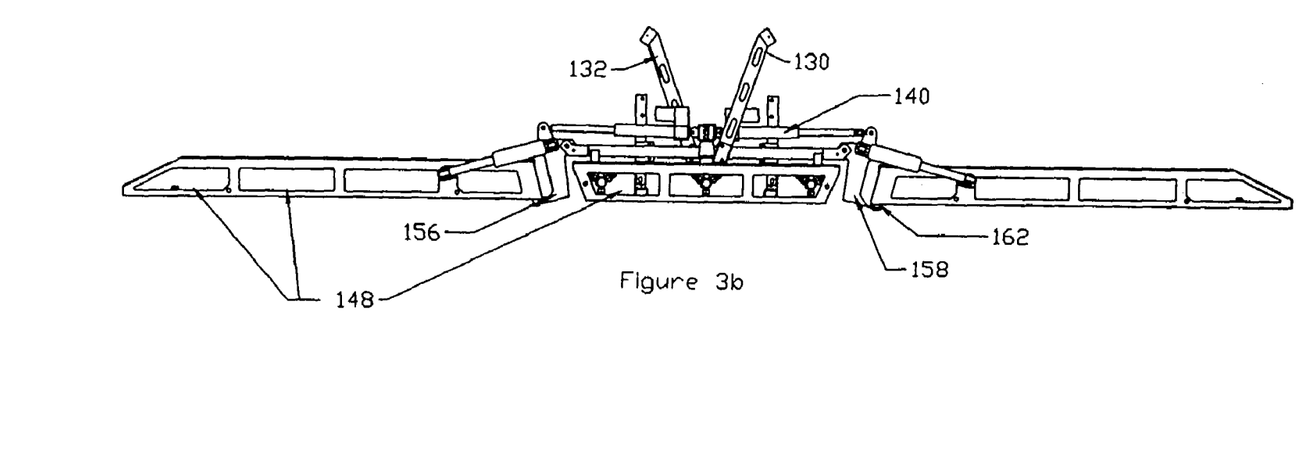

FIG. 3 shows the boom 100 again with the shroud 40 removed for clarity. FIG. 3A shows a view of the boom 100 from above and FIG. 3B shows a view of the boom 100 from behind relative to the normal direction of vehicle 20 travel. As seen in FIG. 3A the boom 100 can include attachment bars 124, 126 to mount the boom 100 to the vehicle 20. Boom movable arms 106 and 108 are aligned parallel to the fixed arm 102 when the movable arms 106, 108 are positioned for use. As seen in FIGS. 3A and 3B each movable arm 106, 108 includes a boom pivot bracket 156 and 158. A pivot point (best shown in FIG. 8) on each pivot bracket 156, 158 is mounted at a 4 degree angle, relative to a perpendicular line to fixed arm 102. The 4 degree angles are such that as the movable arms 106, 108 are pivoted upwards the movable arm 106 pivots to a position behind movable arm 108 (shown in FIG. 5B). The angles cause the movable arm 106 to pivot slightly toward the front of the vehicle 20 and the movable arm 108 to pivot slightly to the rear. Each movable arm 106, 108 can include multiple windows 148 in the back, bottom and front surfaces of the frames 120, 136, 138. Nozzles 200 can be seen through the openings 148 and the openings 148 provide service access to the nozzles 200. FIG. 3A shows that the arms 102, 106, 108 lie on a common center line "C" in the normal operating position. The actuators 140, 142 and the pivot brackets 156, 158 are offset by 4 degrees to this center line "C" such that the arms 106, 108 can fully retract with one arm 106 closer to the vehicle 20 than the other arm 108 and such that the arms 106, 108 appear to cross when viewed from in front of or behind the vehicle 20.

Figure 4:
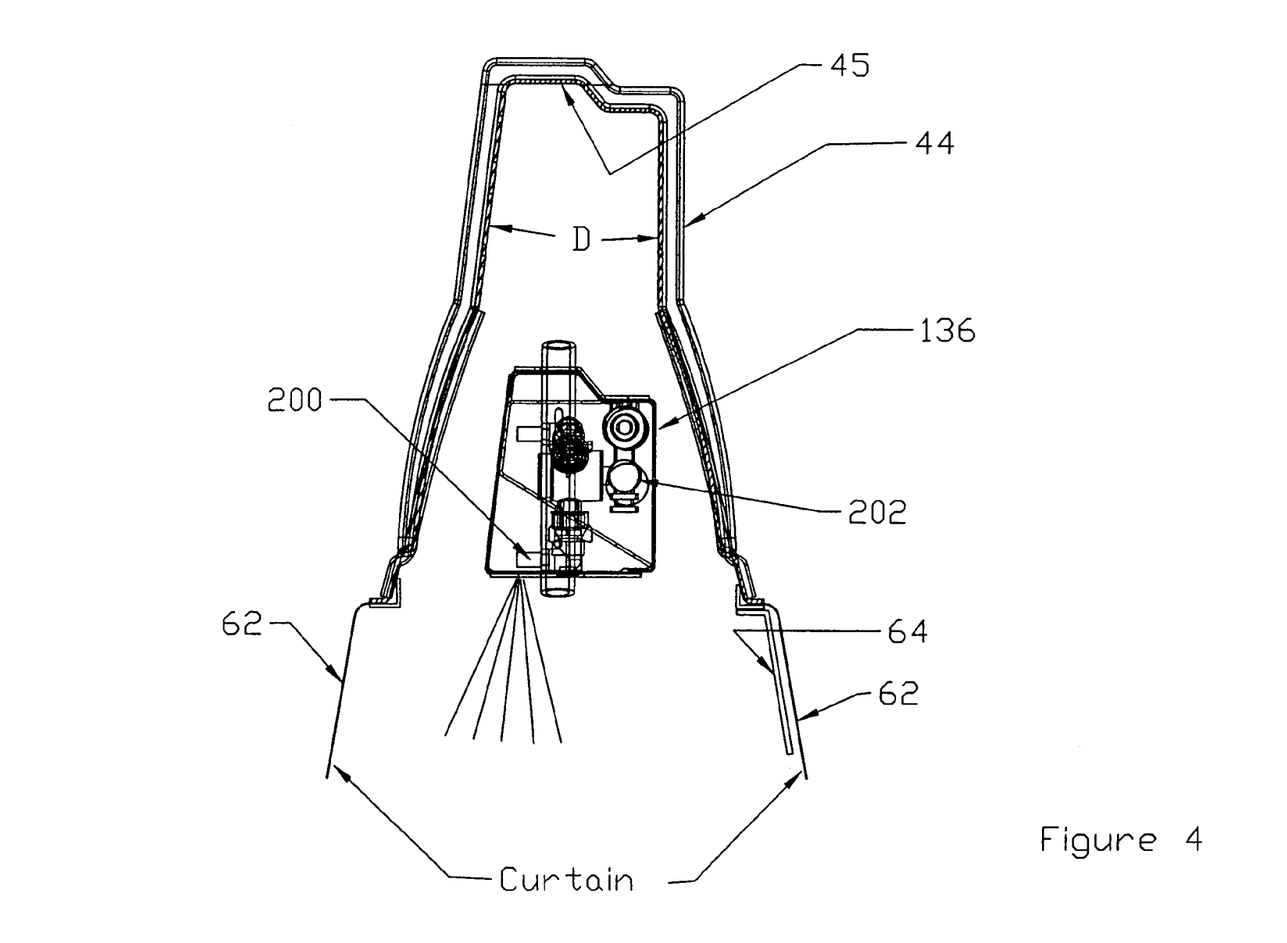
FIG. 4 shows a cross-section of an arm.

FIG. 4 shows a cross-sectional view of the fixed arm 106. FIG. 4 shows details of the nozzle 200, how the nozzle 200 and associated plumbing 202 is mounted and protected by the surrounding sheet metal frame 136. It will be understood that a sectional view of arms 102, 108 would be similar as nozzles 200 are all mounted within one of the sheet metal frames 120, 136, 138. The nozzles 200 spray through openings 148 in the frame 120. The cross-sectional view clearly shows that the frames 120, 136, 138 can have a draft angle "D" that can aid in the installation of the shroud 40. The shroud piece 44, shown in cross-section, can have the same or a slightly smaller draft angle "D" on its inside opening 45, such that just dropping the shroud piece 44 onto the frame 120, 136, 138 will tend to hold it securely in place even without pins 46. Thus, the shroud piece 44 at least partially holds itself in place on the frame 136. As the boom 100 will be subject to frequent, almost continuous vibration during operation, it may be desirable to add some quick release nylon or plastic pins 46 to help hold the shroud piece 44 in place (see FIG. 6).

Figure 4A:
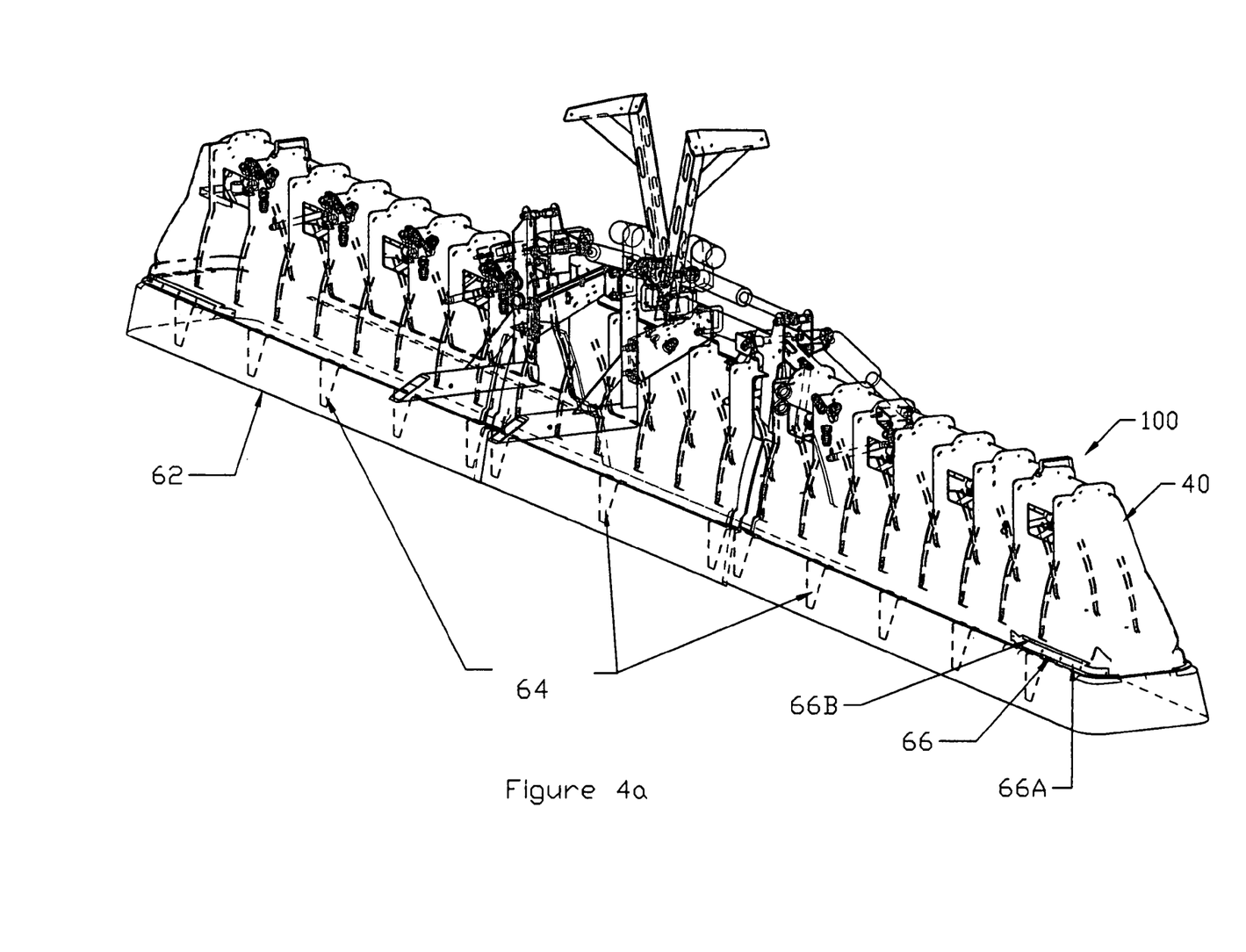
FIG. 4A shows the covered boom with hidden line detail.

As shown in FIGS. 4 and 4A, the shroud 40 further includes a curtain 62 known in the art to provide protection to the components assessed through the openings 148. Preferably, a plurality of extending flaps 64 are disposed between the curtain 62 and openings 148 in order to prevent the curtain 62 from blowing back into the openings 148 due to wind and the forward motion of the boom 100. In the preferred embodiment, the flaps 64 are attached to the frames 120, 136, 138 with rivets. The flaps 64 are preferably constructed of plastic.

As best shown in FIG. 4A, a damper 66 is attached to the outer surface of the shroud 40 and is provided to protect selected areas of the shroud 40 from damage upon impact with foreign objects such as a tree, pole or building during application. In particular, the damper 66 is designed of material to absorb the impact resulting from any such collision. In the preferred embodiment, the damper 66 is comprised of a first layer 66A preferably constructed of a plastic material, and a second layer 66B preferably constructed of a closed-cell foam material.

Figure 5A:
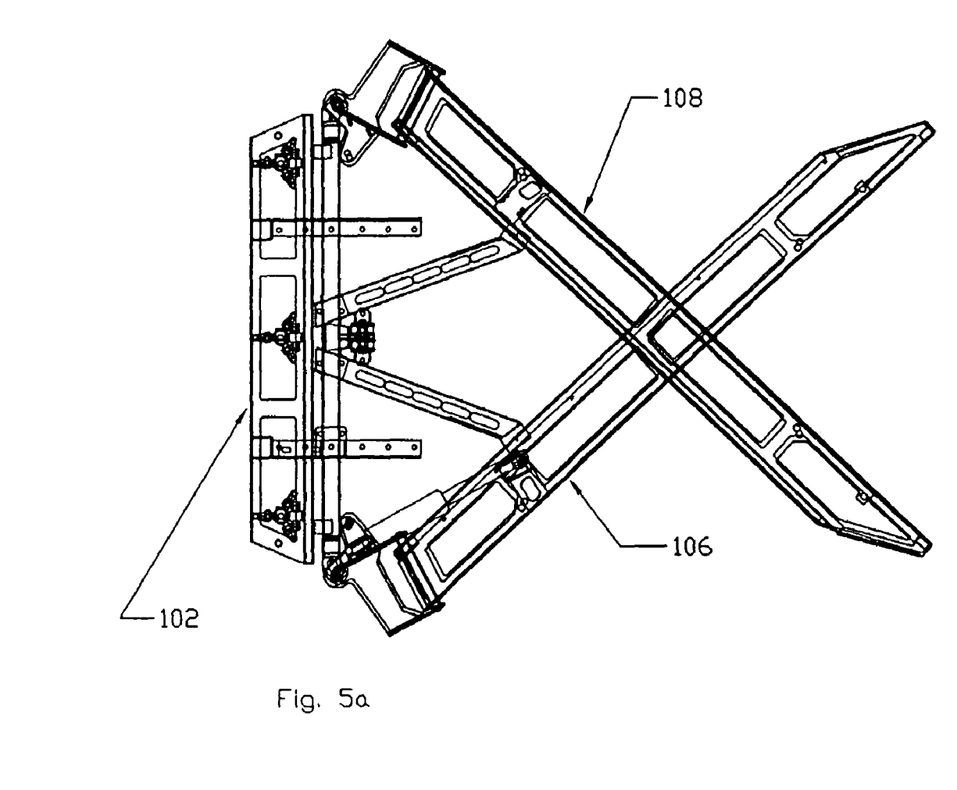
FIGS. 5A and 5B show the boom arms in the retracted position.
Figure 5B:
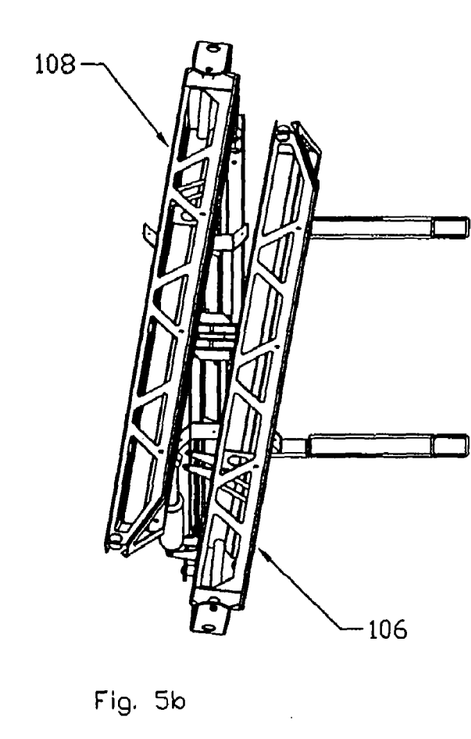

FIG. 5 shows the movable arms 106 and 108 in the retracted position. As can be seen in FIG. 5A, the movable sections 106, 108 form an "X" when viewed from behind the vehicle 20. The "X" creates a narrow width allowing the system 10 to fit through tight openings. The width of the system 10 with the movable arms 106, 108 in the retracted position is about the same as the width of the fixed arm 102 that the movable arms 106, 108 cross above. As can be seen in FIG. 5B, one movable arm 106 lies behind and parallel (as viewed from above) to the other movable arm 108 in the retracted position. The 4 degree angular offset, shown in FIG. 3A and 4, allows the movable arms 106, 108 to fully pivot to a retracted position without interference. That is to say the path of the travel of movable arm 106 does not intersect the path of travel of movable arm 108. As seen in FIG. 5B the overall height of the arms 106, 108 in the retracted position is lower than they would be if extending straight up. This is an additional benefit of the "X" retracted position. Each movable arm 106, 108 can pivot beyond 90 degrees to approximately 135 degrees from the normal horizontal use position to the retracted stored position.

Figure 6:
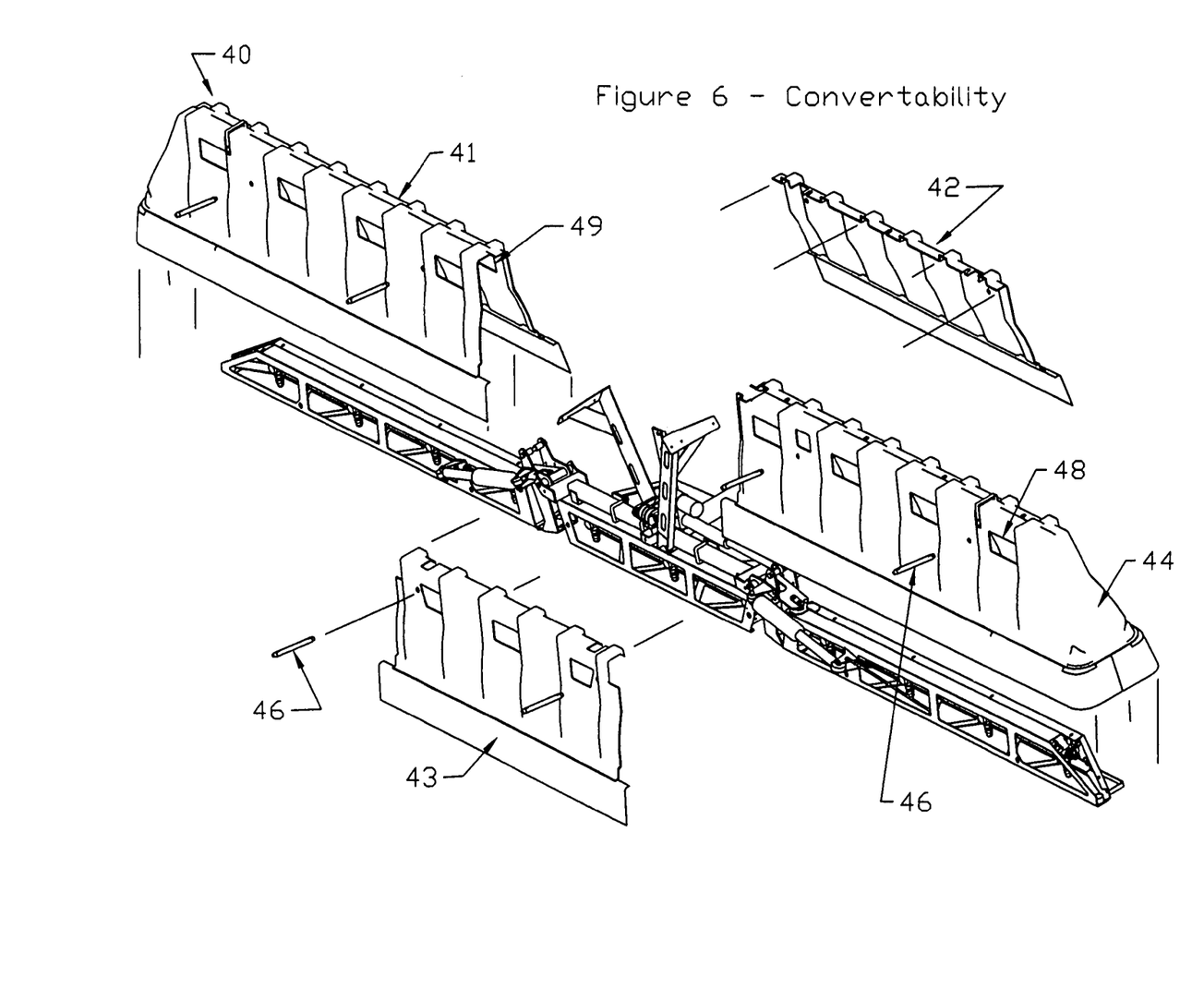
FIG. 6 is an exploded view of the boom.

FIG. 6 shows a partially exploded view of the boom 100 with shroud 40 position for installation. Shroud 40 can include 4 pieces 41, 42, 43, 44 that can be attached to the boom 100 using fasteners such as plastic or nylon pins 46. Each shroud piece 41, 42, 43, 44 can include windows 48 in the back surface and windows 49 toward the vehicle 20 that allow a vehicle operator to observe that each nozzle 200 is spraying and the windows 48 provide access to service or adjust the nozzles 200. The operator can observe the spray operation through windows 49 while still in the operator's seat 26. The shroud pieces 41, 42, 43, 44 can be of any material but molded plastic would have ideal characteristics of light-weight, resistant to rattling, and corrosion resistant. Plastic also does not have sharp corners that can cut a user at windows 48, 49. The windows 48, 49 are high enough on the shroud pieces 41, 42, 43, 44 that wind passing through them will not significantly effect the spray pattern.

Figure 7:
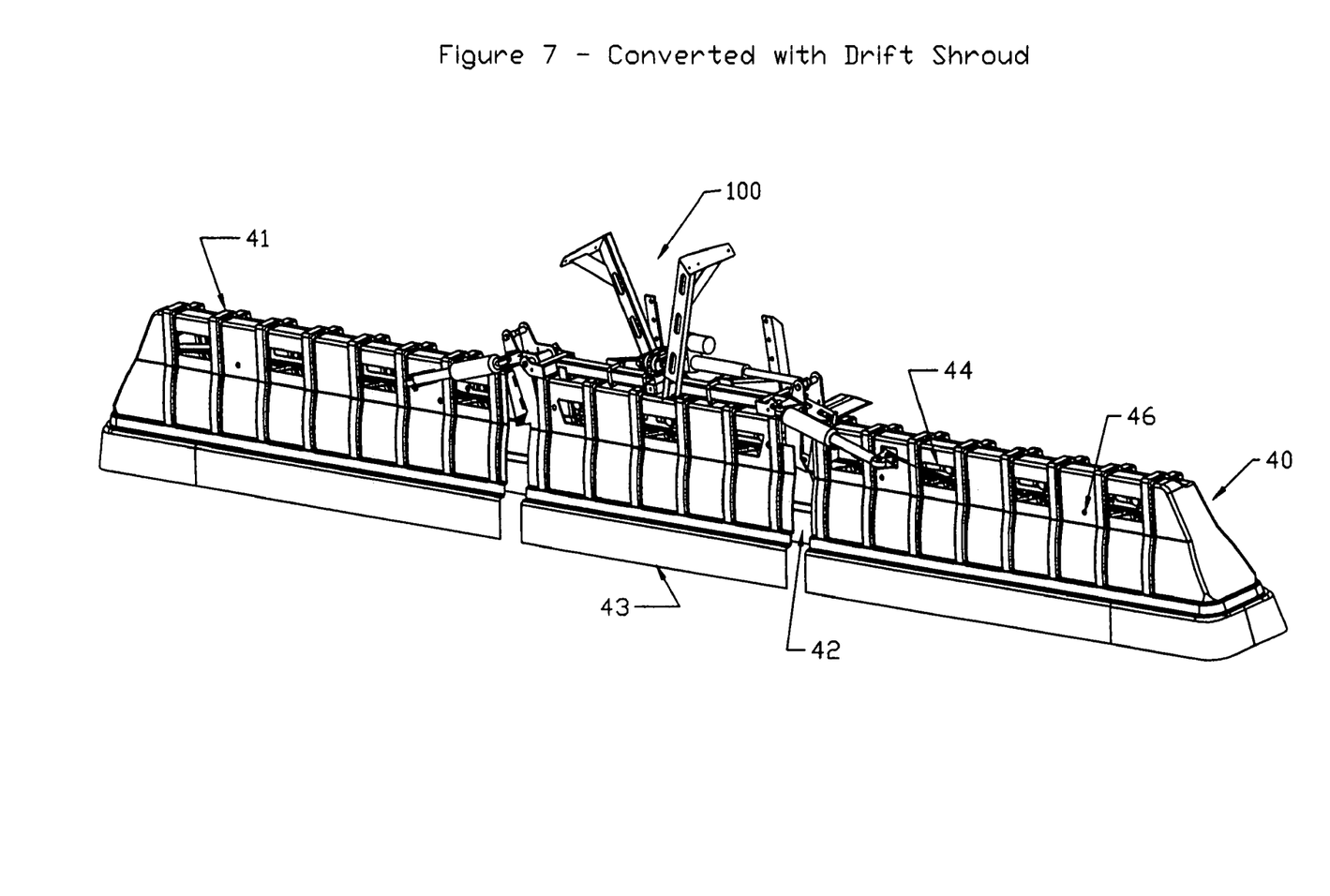
FIG. 7 shows the boom with shrouds installed.

FIG. 7 shows each piece 41, 42, 43, 44 of the shroud 40 installed on the boom 100 to form the complete shroud 40.

Figure 7A:
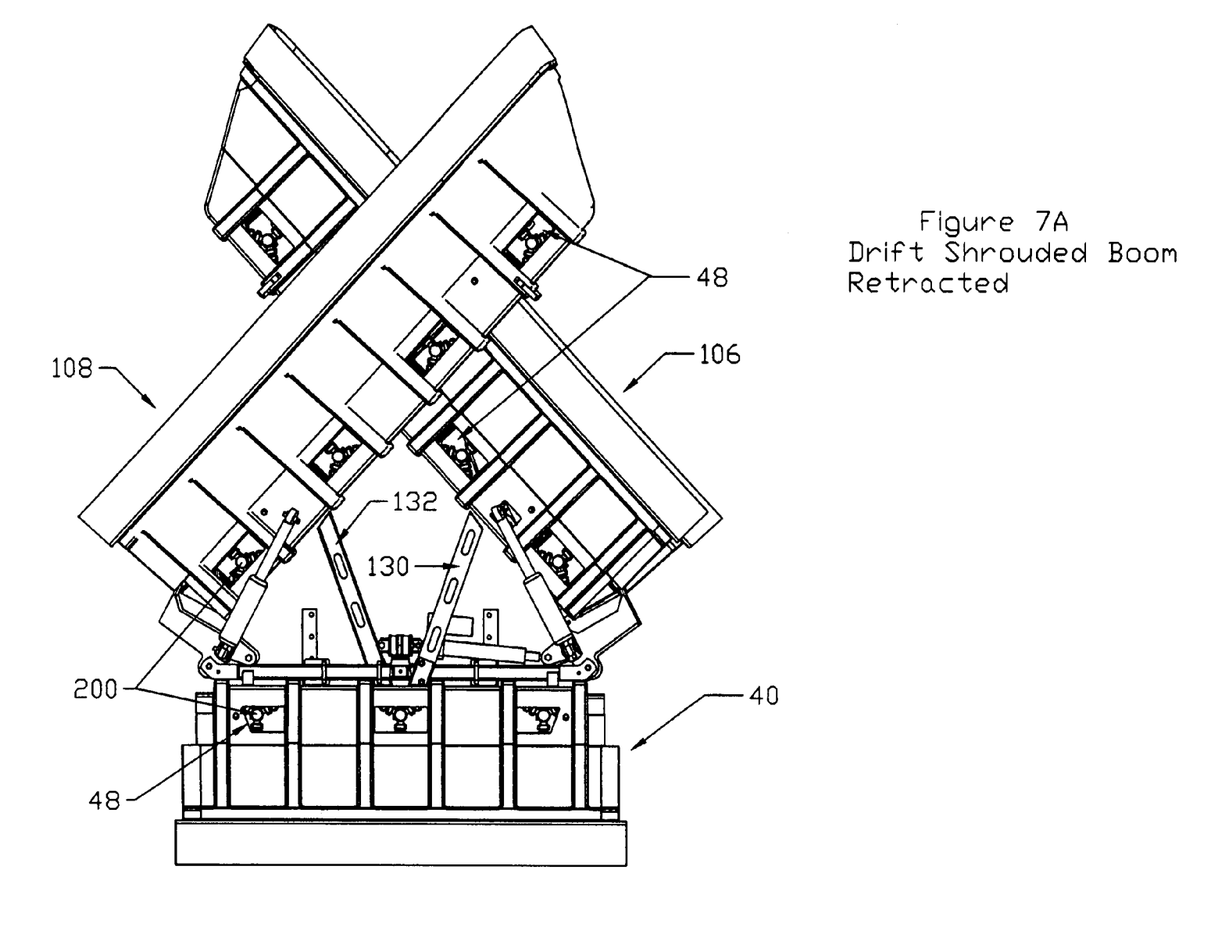
FIG. 7A shows the boom arms with shrouds in the retracted position.

FIG. 7A shows the boom 100 retracted to the retracted "X" position with the shroud 40 in place. The nozzle 200 are visible through the windows 48. As can be seen movable arm 108 rests against stop 132 and arm 106 against stop 130 in the retracted position. Though not shown, it will be understood that the control 124 can control the arms 106, 108 together or individually such that one arm could be in the in use position and the other pivoted up. This would allow an operator to spray with the fixed arm 102 alone, or the fixed arm 102 only with the movable arm 106 or the fixed arm only with a movable arm 108.

Figure 8:
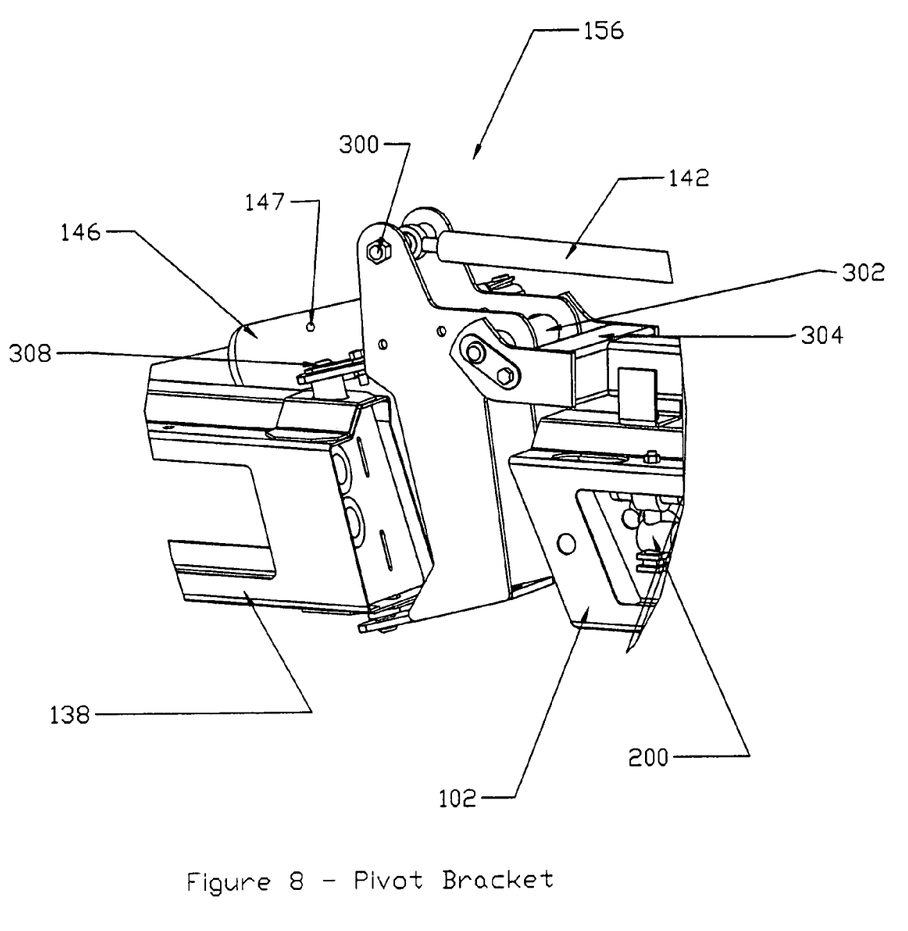
FIG. 8 shows detail of the pivot bracket.
Figure 10:
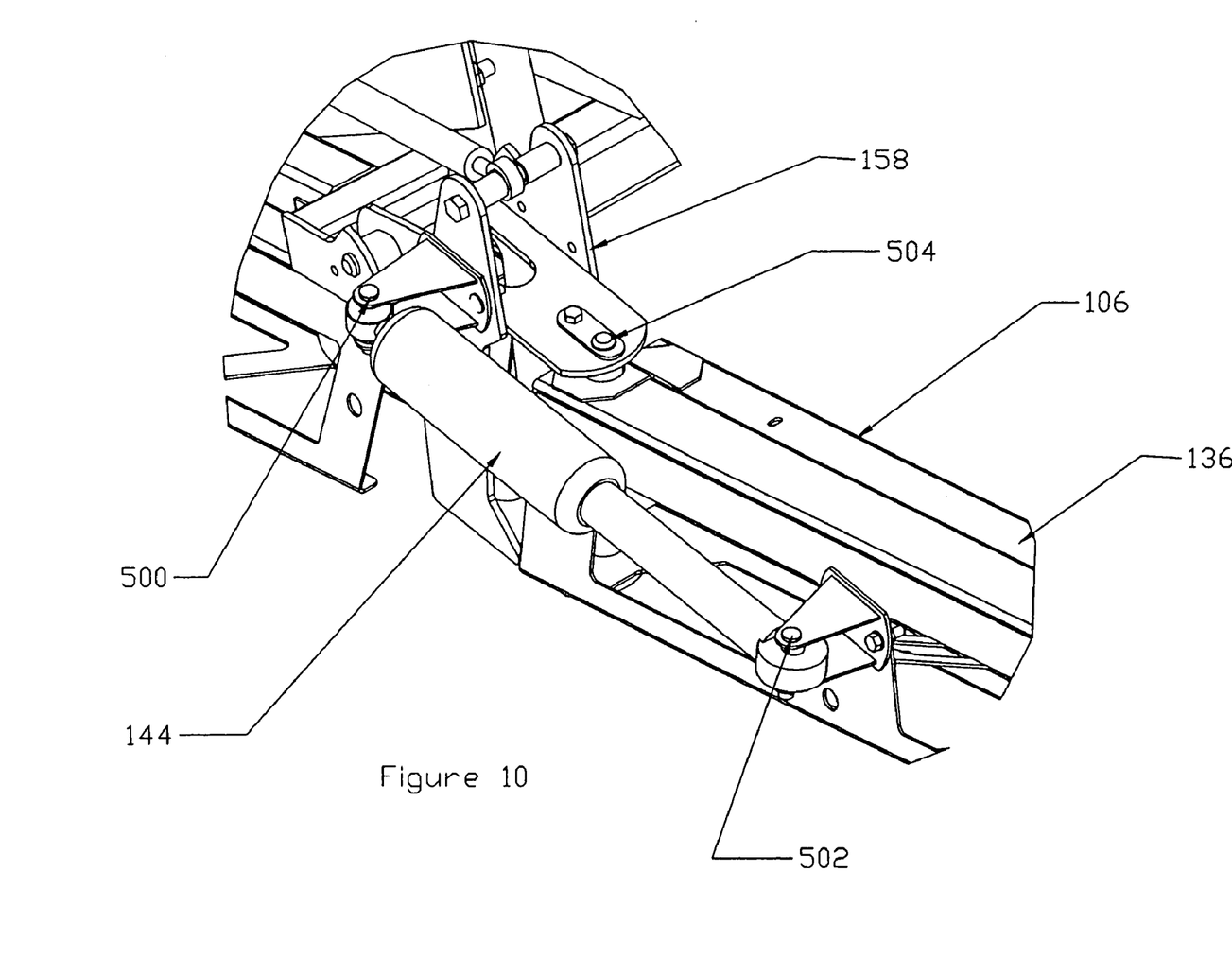
FIG. 10 shows details of the pivot shock.

FIG. 8 shows details of the pivot bracket 156. It will be understood that the pivot bracket 158 is a mere image of pivot bracket 156. Actuator 142, which can be hydraulic, pneumatic or electric, can be pivotally mounted to pivot bracket 156 with pin 300. A second pin 302 mounts the pivot arm 156 to the fixed arm 102 through a rod 304. The second pin 302 is considered to be the main pin as it supports most of the weight of the movable arm 106 in its retracted position. As best seen in FIG. 10, the tube assembly 304 is shock mounted to the fixed arm 102. A third pin 308 mounts the frame 138 for pivotal movement forward and backward if the frame 138 strikes an object during use of the vehicle 20. The pivot brackets 156, 158 and actuators 142, 144 provide sufficient support that wheels are not required on the ends of the arms 106, 108.

The forward and backward motion of the frame 138 is resisted by adjustable air shock 146. A user can pump air into or release air from the shock 146 using nozzle 147 for example to adjust the resistance of the shock 146 to impact and speed with which the frame 138 will return to its normal use position shown in FIG. 1.

Figure 9:
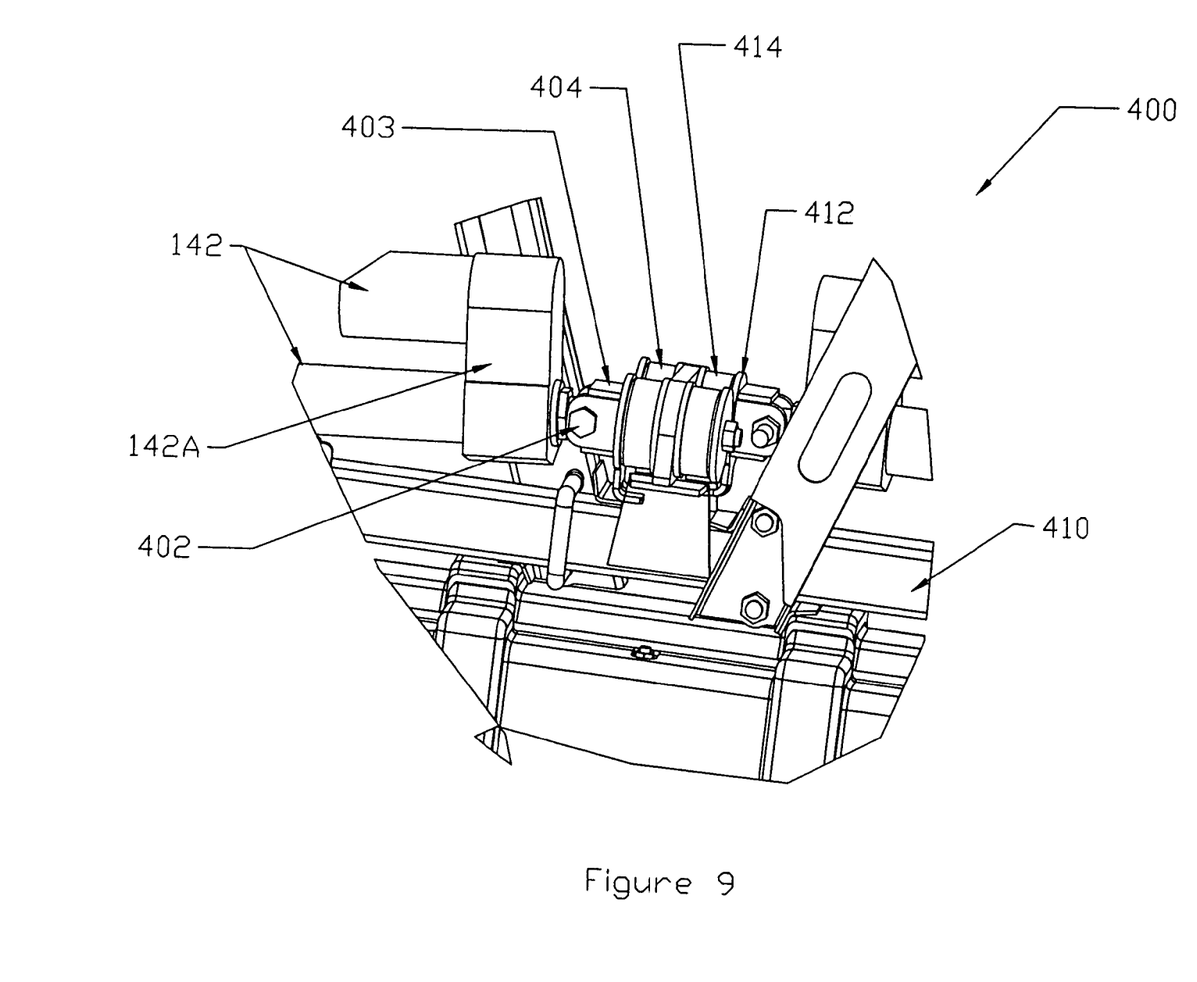
FIG. 9 shows detail of the shock mount.

FIG. 9 shows the vibration shock mounting 400. An end 142A of actuator 142 is bolted 402 to a fixture 403. The fixture 403 is mounted to the system 10 frame 410 through a vibration dampening pad 404. The pad 404 absorbs vibrations from the movable arm 108. The pad 404 primarily absorbs vibrations and motion energy caused by up and down motion of the arm 108 caused as the vehicle 20 traverses bumps for example. Forward and back motion in arm 108 will tend to be absorbed primarily by the shock absorber 146, see FIG. 10. A second vibration pad 414 absorbs motion energy from arm 106 transmitted through fixture 412. The combination of the plastic shroud 40, plastic or nylon pins 46, vibration dampening pads 404, 414, shock absorbers 146, 144, and impact damper 66 make this system 10 very quiet and easy on the operator as the system 10 does not transmit excess noise and vibration to the operator or to spray pattern. The noise and vibration dampening will also extend the service life of the system 10 and also help to eliminate the need for castor wheels on the ends of arms 106, 108.

FIG. 10 shows details of the shock absorber 144 and arm 106. The shock absorber 144 is pivotably pinned 500, 502 to pivot bracket 158 and frame 136. Pivot point 504 allows the frame 136 to swing forward or back relative to pivot bracket 158. This pivoting forward or back can occur in the retracted or extended position of the movable arm 106.

Figure 11:
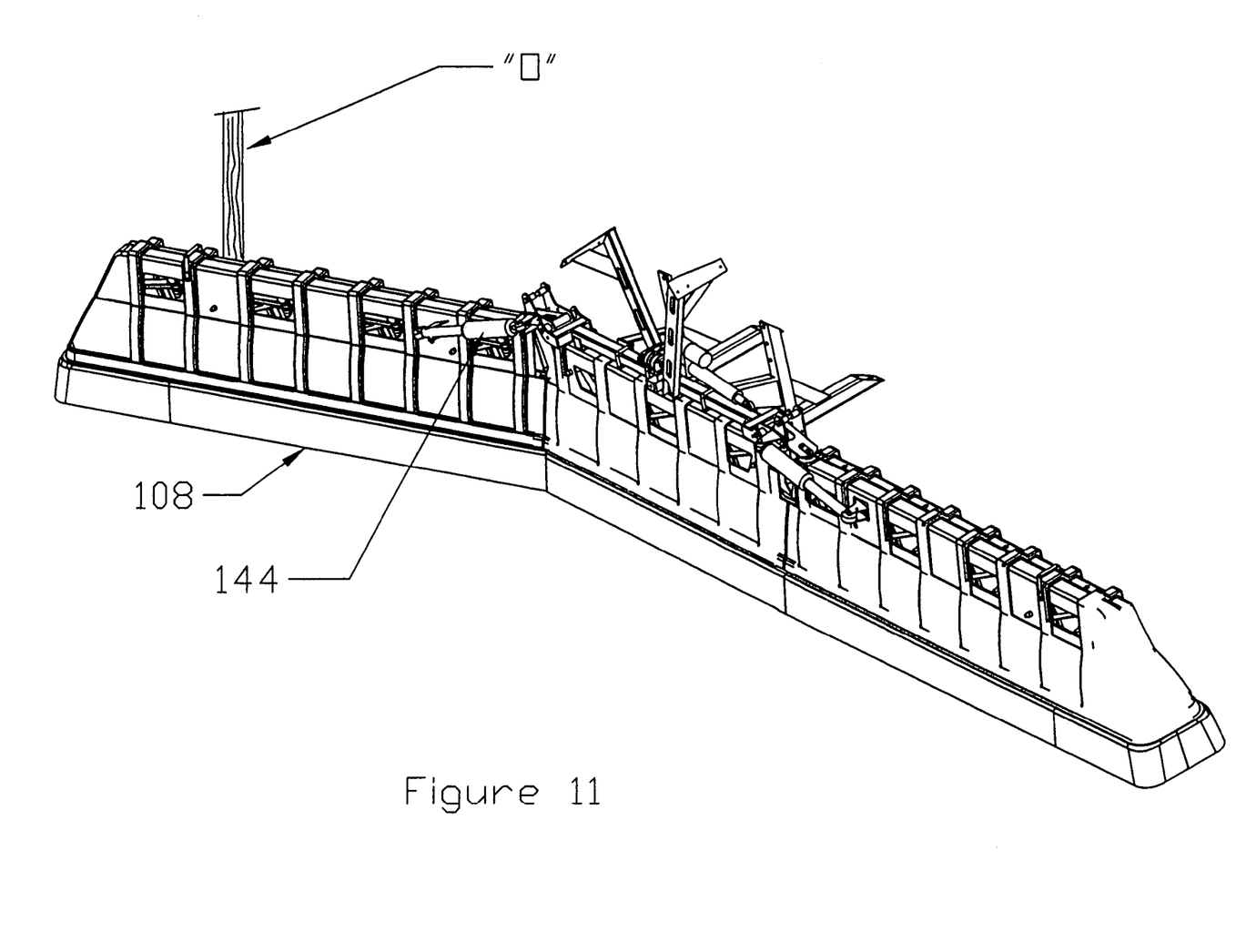
FIG. 11 shows a view of the boom after striking an object.

FIG. 11 shows the left hand movable arm 108 pivoted backwards after hitting an obstructing object "O" such as a tree, pole or building for example. Objects such as these are common around a golf course. As soon as the object "O" is cleared, typically the gas shock 144 will return the movable arm 108 back to its normal operating position. The rate at which the arm 108 returns can be set by the operator who can add or remove air from the gas shock 144 to adjust the pressure in the shock 144.

In operation, an operator can drive the vehicle 20 to apply liquid chemicals from the tank 30. From his seat 26 in the vehicle 20 an operator can raise or lower one or both of the movable arms 106, 108 using control 24. The operator can dispense liquid from any or all nozzles 200 on the boom 100. The spray operation can be observed by the driver from his seat 26 using windows 48, 49, which align with at least some of the openings 148 in the front and rear surfaces of arm frames 120, 136, 138, for each nozzle 200 with or without the drift shroud 40 installed.

The frames 120, 136, 138 protect the nozzles 200 and provide easy on and off of shroud 40. If the operator is using the system 10 without the shroud 40 and the operator decides it is too windy and he needs the shroud 40, he can simply drop shroud pieces 41 and 44 in place. Because of the draft angle "D" of the frames 120, 136, 138 the shroud pieces will fit firmly. Shroud pieces 42 and 43 and pins 46 can be added to complete the shroud 40. The system 10 is still fully functional with the shroud 40 in place. The movable arms 106, 108 can still retract to the "X" store position and can still pivot forward or backwards if an object is hit. The operator can also see the spray operation and services nozzles 200 because of windows 48 and 49.

If an object is hit by movable arms 106, 108 during use the adjustable shock absorbers 144, 146 will control the initial breakaway pivot of the movable arms 106, 108 as an object is hit but will also control the rate of return of the arms 106, 108 once the object is cleared. Prior art detent arms must be returned manually. Prior art spring loaded arms slam back into position under an excessive spring loading.

Although the description above contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It will be obvious to those skilled in the art that modifications may be made to the embodiments described above without departing from the scope of the invention. Thus the scope of the invention should be determined by the claims in the formal application and their legal equivalents, rather than by the examples given.

We claim:

1. A spray delivery system including:
    a vehicle,
    a boom attached to said vehicle,
    said boom including a first movable arm said first movable arm including spray nozzles,
    a tank of liquid carried on said vehicle and supplying liquid to said nozzles,
    said first movable arm further including a frame having openings,
    said nozzles mounted inside said frame adjacent to said openings such that liquid from said nozzles passes through said openings, and
    said first movable arm including a first spray application position and a second retracted position, wherein said boom further includes a fixed arm and second movable arm,
    wherein said first movable arm is mounted to said vehicle with a first pivot bracket and said second movable arm is mounted to the vehicle with a second pivot bracket, and wherein said first movable arm is angularly offset relative to said vehicle such that as said first movable arm pivots to said retracted position it moves towards said vehicle and said second movable arm is angularly offset relative to said vehicle such that as said second movable arm pivots to said retracted position it moves away from said vehicle.

2. The spray delivery system as recited in claim 1, wherein said first and second movable arms each include an actuator to move each said first and second movable arms from said spray application position to said retracted position.

3. The spray delivery system as recited in claim 2, wherein when said first and second arms are in the retracted position they cross to form an "X" when viewed from behind said vehicle.

4. The spray delivery system as recited in claim 3, wherein said first and second movable arms each include a shock mount that allows each said movable arm to pivot away from an obstruction, said shock mount returning each said arm to said spray application position when said obstruction is removed.

5. The spray delivery system as recited in claim 4, wherein said first and second movable arms are each mounted to said vehicle through a vibration absorbing pad.

6. The spray delivery system as recited in claim 3, wherein said first and second movable arms are covered by drift control shrouds.

7. The spray delivery system as recited in claim 4, wherein said vehicle includes a control adjacent to an operator seat such that an operator can control a position of the first and second movable arms from said seat.

8. The spray delivery system as recited in claim 7, wherein the actuators for said first and second arms are electric.

9. The spray delivery system as recited in claim 6, wherein said drift control shrouds are removable and include windows that overlap at least some of said openings in said frame when said drift shrouds are installed such that said nozzles are visible from an operators seat on said vehicle.

10. A boom spray delivery system including:
a vehicle attachment,
a sectional boom attached to said vehicle attachment,
said sectional boom including a first movable arm said first movable arm including spray nozzles,
a fixed arm, said fixed arm including spray nozzles,
said first movable arm further including a frame having openings on a front, rear and bottom surface,
said first movable arm further including an operation position and a retracted position, and
said first arm further including a first shroud covering said arm to prevent wind from interfering with the application of spray from said nozzle and,
wherein said nozzles are mounted adjacent said openings inside said frame and said first shroud covering is removable and includes windows that overlap at least some of said openings in said frame when said first shroud covering is installed such that said nozzles are visible from an operator's seat.

11. The boom spray delivery system as recited in claim 10, wherein said fixed arm is covered by a second shroud covering.

12. The boom spray delivery system as recited in claim 10, wherein said frame includes a draft angle, and wherein said first shroud covering is sized to fit tightly over said frame with said draft angle.

13. The spray delivery system as recited in claim 10, wherein said boom includes a second movable arm.

14. The spray delivery system as recited in claim 13, wherein when said first and second movable arms are in said retracted position they cross to form an "X".

15. The spray delivery system as recited in claim 14, wherein said first and second movable arms cross above said fixed arm.

16. The spray delivery system as recited in claim 14, wherein said system includes a control adjacent to an operator's seat such that an operator can control the position of the first and second movable arms from said seat.

17. A boom spray delivery system including:
a boom attachable to a vehicle,
said boom including a first movable arm, said first movable arm including at least a first spray nozzle,
a fixed arm, said fixed arm including at least a second spray nozzle,
said first movable arm including a frame having openings,
said first movable arm including an operation position and a retracted position, and
said first arm including a first removable shroud covering, said first removable shroud covering to prevent wind from interfering from the application of spray from said first nozzle,
wherein said frame includes a first draft angle and said first shroud covering includes a second draft angle on an inside surface to fit tightly over said frame to at least partially hold said shroud in place on said frame, wherein said shroud covering includes windows that overlap at least some of said openings in said frame when said shroud covering is installed such that said first nozzles are visible from an operator's seat.

18. The boom spray delivery system as recited in claim 20, wherein said shroud covering further comprising a curtain.

19. The boom spray delivery system as recited in claim 18, further comprising a plurality of flaps sandwiched between said curtain and said openings in said frame.

20. The boom spray delivery system as recited in claim 20, further comprising an impact damper selectively attached to an outer surface of said shroud covering.

21. The boom spray delivery system as recited in claim 20, wherein said fixed arm is covered by a second shroud covering.

22. The boom spray delivery system as recited in claim 20, wherein said frame is a sheet metal frame and wherein said shroud covering is plastic and wherein said shroud covering includes at least one window cut into said shroud covering such that an operator can observe the application of spray while said shroud covering is installed on said frame.

23. A spray delivery system including a sectional boom attached to a vehicle, the boom including a first and second movable arms and a fixed arm, each arm housing a plurality of spray nozzles, the each arm includes a frame having openings so that the each arm is light-weight and so that the nozzles housed in the frame for protection can spray through the openings, wherein the first and second movable arms include an operation position and a retracted position and the first and second arms each include a drift shroud covering to prevent wind from interfering with the application of spray from said nozzles and wherein each said drift shroud includes windows that align with at least some of the openings in the frame such that an operator can see the spray from the nozzles from an operator's seat in the vehicle.

24. The spray delivery system as recited in claim 23, wherein said vehicle includes a control that can control pivotal movement of said first and second arms from said extended operating position to said retracted position.

25. The spray delivery system as recited in claim 24, wherein when said first and second movable arms are in the retracted position they cross above said fixed arm.

* * * * *